United States Patent [19]

Figura

[11] Patent Number: 5,477,927
[45] Date of Patent: Dec. 26, 1995

[54] TURF MAINTENANCE AND BRUSHING MACHINE

[75] Inventor: William L. Figura, Rice Lake, Wis.

[73] Assignee: Applied Design Technology, Ltd., Chetek, Wis.

[21] Appl. No.: 186,969

[22] Filed: Jan. 26, 1994

[51] Int. Cl.⁶ .................................................. A01B 45/02
[52] U.S. Cl. ................................ 172/29; 56/16.4 R
[58] Field of Search ............................... 56/328.1, 372, 56/377, 400.02, 16.4; 172/612, 189, 27, 28, 29, 30, 110, 111; 15/87, 78

[56] References Cited

U.S. PATENT DOCUMENTS

| | | | |
|---|---|---|---|
| 348,778 | 9/1886 | Reynolds . | |
| 590,288 | 9/1897 | Winspear et al. . | |
| 670,968 | 4/1901 | Ranger . | |
| 698,949 | 4/1902 | Hight . | |
| 993,603 | 5/1911 | Jones | 15/87 X |
| 2,042,405 | 5/1936 | Knudson | 172/189 |
| 2,706,941 | 4/1958 | Swanson . | |
| 3,893,286 | 7/1975 | Buttram et al. . | |
| 4,505,096 | 3/1985 | Brown | 172/30 X |
| 4,989,676 | 2/1991 | Rogers . | |
| 5,002,453 | 3/1991 | Shigehisa | 172/22 X |
| 5,018,587 | 5/1991 | Gandrud . | |
| 5,069,293 | 12/1991 | St. Romain | 172/22 |
| 5,076,367 | 12/1991 | Reincke . | |

FOREIGN PATENT DOCUMENTS 132755  1/1931  Austria .

*Primary Examiner*—Eric K. Nicholson
*Assistant Examiner*—Robert Pezzuto
*Attorney, Agent, or Firm*—Larry M. Jennings

[57] ABSTRACT

A powered brushing system can be mounted on triplex mowers, front mowers, utility tractors and other motor vehicles for use in conjunction with the aeration and maintenance of golf courses, particularly tee areas and greens. The holes left by core or spike aerators used to condition turf must be filled with sand or other topdressing. Elongated rotary brushes extend radially in a horizontal plane from a vertical axis about which they rotate. Vertical bristles extend downward and touch the ground while rotating to stir the topdressing and sweep it to evenly fill aeration holes. The preferred embodiment is comprised of five rotary brushes having overlapping swept areas and synchronous rotation. The swirling motion of the bristles of the counter-rotating rotary brushes may also be used effectively to remove grain which has developed in turf. The brushing system can, in this manner, greatly improve the evenness with which mowing of fine turf areas is performed. Rotary power is provided to the brush system by hydraulic or hydrostatic drive motor, power take-off, or independent engine.

30 Claims, 4 Drawing Sheets ered; therefore, the dispersal of sand is primarily in the direction of brush travel. A device manufactured by Smithco-Egandahl incorporates a ground-driven reciprocating assembly that imparts limited reciprocal motion to the brushes as it is drawn behind a tractor.

TURF MAINTENANCE AND BRUSHING MACHINE

FIELD OF THE INVENTION

The present invention relates to outdoor power equipment generally. In particular, this invention concerns the maintenance of high traffic turf areas such as athletic fields and golf courses, especially tee areas and greens.

BACKGROUND AND SUMMARY OF THE INVENTION

Heavily used turf areas such as golf courses, athletic fields, parks, and recreational areas require regular maintenance to remain in good condition. Golf course fairways and, particularly, greens and tee areas are examples of turf that must be properly maintained to prevent severe and unacceptable degradation as the result of ordinary wear which in inherent in the intensive use to which such areas are subjected.

In order to promote vigorous growth necessary to maintain healthy turf, groundskeepers periodically aerate turf that is prone to becoming packed. Aeration is normally accomplished using either a spike aerator or, preferably, a core aerator drawn over the turf. The aerator makes a series of holes in the soil surface. It is beneficial to incorporate materials such as sand and/or peat into the soil, preferably by filling the holes made by the aerator. Sand, a sand/peat mixture, or other materials may be applied as a topdressing after aeration. After the topdressing material is distributed onto the turf, it must be incorporated into the soil to be effective; it is often worked into holes left by the aerator using brooms, rakes or similar tools.

Incorporating topdressing into the aerator holes manually is difficult and labor-intensive. There have been several previous attempts at developing machinery to assist in the task, but all have failed to satisfy fully the needs of groundskeepers. For example, U.S. Pat. No. 5,018,587 to Gandrud discloses a brush attachment for pulling behind a tractor. U.S. Pat. No. 4,989,676 to Rogers discloses a brush attachment adapted for pulling behind a mower for sweeping sand while mowing. Neither brush system is independently powered; therefore, the dispersal of sand is primarily in the direction of brush travel. A device manufactured by Smithco-Egandahl incorporates a ground-driven reciprocating assembly that imparts limited reciprocal motion to the brushes as it is drawn behind a tractor.

Because the previously known inventions move topdressing primarily in the direction of machine travel, it is often necessary to make multiple passes in order to sufficiently incorporate topdressing material into holes made by an aerator. Making multiple machine passes causes soil compaction, the very problem that necessitated the aeration procedure in the first place. In addition, dragging brushes linearly over turf can aggravate another problem, turf grain.

Turf grass can become aligned in one direction or take a set orientation in response to wear or machine travel. This set, or grain, can cause golf balls to roll differently in one direction compared to another and increase the tendency of the turf to mat down. Matted turf becomes disease-prone and is difficult to mow evenly.

What is needed is a system for efficiently and thoroughly incorporating topdressing materials into the holes formed by soil aeration without causing the turf to develop a grain. The present invention incorporates topdressing following soil aeration more quickly and more thoroughly than previously disclosed devices. In addition, the present invention is better adapted for raising matted grass to improve appearance, make mowing easier, and reduce turf damage caused by ordinary use.

The present invention is comprised of a frame extending between the motor vehicle to which it is mounted and casters opposite the motor vehicle. A deck is adjustably mounted to the frame. Synchronously counter-rotating brushes similar to the heads of stiff-bristled brooms used for sweeping shops, concrete floors, and sidewalks are mounted from the deck. Between two and twenty, preferably five, brushes are provided. The length and spacing of these rotary brushes are not critical and may be of any convenient dimensions. Rotary brush length is generally expected to be between one and three feet, preferably two feet, and may have a width of approximately four inches. Rotary brushes may preferably be spaced apart approximately 75% of the length of the individual rotary brush heads to provide overlapping brushing of turf. The preferred source of power for rotating the rotary brushes is an eight cubic inch hydraulic motor although other power sources are equivalent.

The rotary brushes are mounted to a deck resembling a conventional rotary mower deck. The invention is adaptable for mounting on triplex mowers in place of the usual front-mounted mower. The invention is adapted for optional mounting onto utility tractors, lawn and garden tractors, and other motor vehicles suitable for use on turf using two-point, three-point, and other hitch systems. Larger embodiments of the invention such as those using three-point hitch systems for attachment to utility tractors can readily be fabricated with the inclusion of additional rotary brush sets.

A hydrostatic drive motor, power take-off, electric motor, or auxiliary engine provides power for rotating the rotary brushes in a horizontal plane with the bristle ends in contact with the turf. A system of sprockets and chain is preferably used to transmit power from the power source to the rotary brushes. However, other power transmission equipment could be equivalently used to move the rotary brushes including belts, cog belts, gears, levers, cams, cranks, and the like. In cases where overlapping brushing is not wanted, synchronized brush rotation may not be required. The backs of the rotary brushes are attached to the lower ends of shafts which are turned by sprockets. A swirling pattern is described on the surface of the ground by the ends of the bristles as each rotary brush rotated about its vertical axis during use of the invention. The 360 degree movement of the bristles contacting the turf deflects and raises the leaves and stems of the vegetation and reduces the tendency of the grass to develop turf grain.

Casters permit the brushes to closely follow terrain contours by holding the deck at a constant height above the terrain. The deck depends from the frame by, preferably four, hangars and may be stabilized using drag links. Hangars may be adjusted by the operator to reduce or increase the pressure of the brushes against the turf. The adjustable hangars may be equipped with springs for biasing the deck upward to offset the downward pressure supplied to the brush bristles by the weight of the deck.

Optional transverse brushes or sweeps can provide improved brushing performance in some circumstances. The transverse brushes may be configured in any convenient layout, but preferably extend the full length of the brushing machine parallel to its longitudinal centerline which is also perpendicular to the normal direction of machine travel. Sweeps may be fixed to the deck or mounted using a floating mounting. Under some conditions transverse brushes may improve performance of the invention when used for incorporating topdressing.

Although the preferable motion of the powered brushes is described as rotary, orbital brush motion is equivalent to such rotary motion and may be incorporated in embodiments of the invention without departing from the scope of the disclosure. Suitable shields, guards and covers are included to protect the equipment and operators.

Additional advantages and features of the invention will become apparent from the following description of preferred embodiments made with reference to the accompanying drawing figures and claims which form a part of this specification.

DETAILED DESCRIPTION OF THE DRAWING

Figure 1:
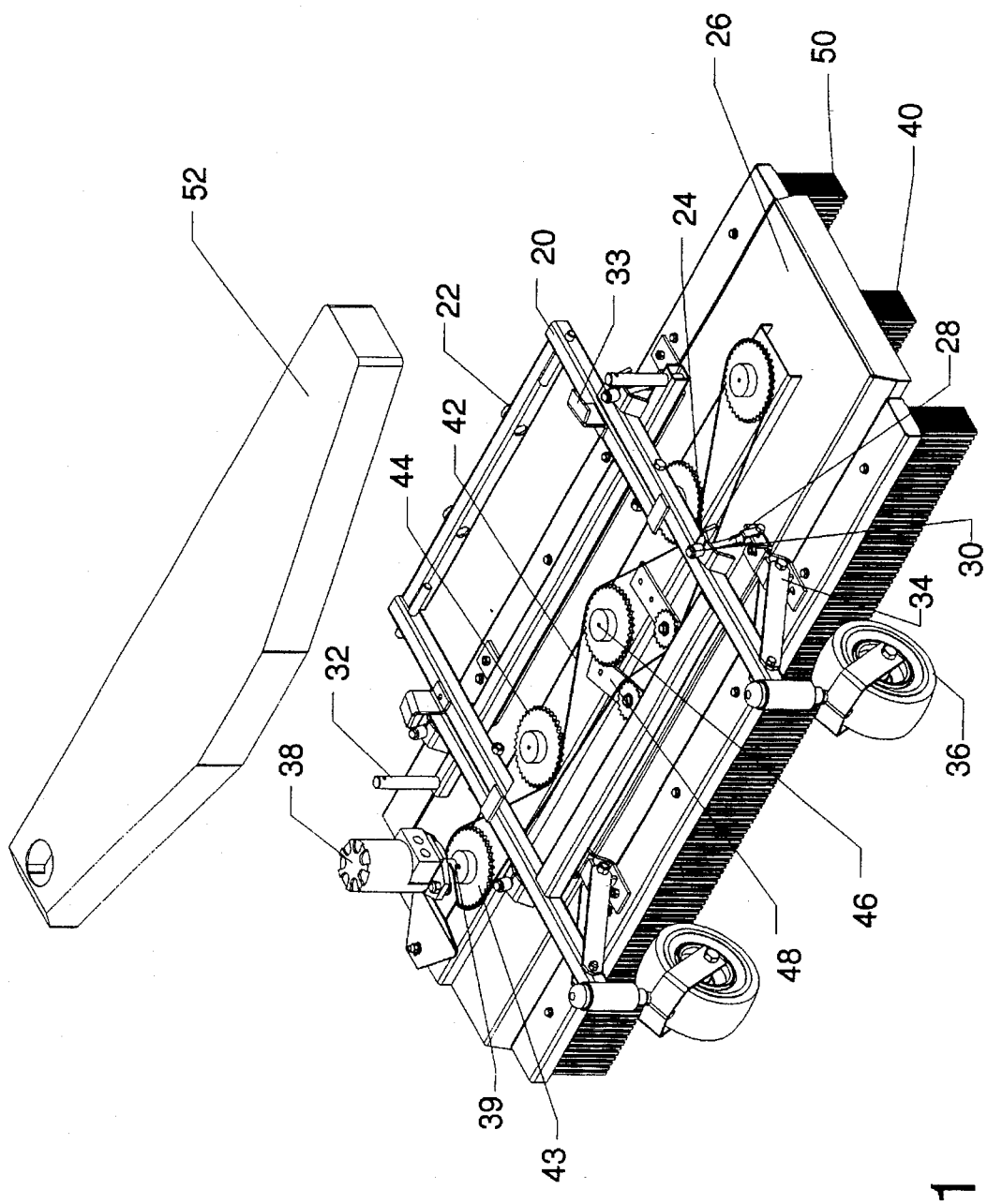
FIG. 1 shows a perspective view of an embodiment of the invention.

FIG. 1 depicts an embodiment of the invention showing a frame 20 having means for attachment 22 to a motor vehicle such as a triplex mower, utility tractor, or other utility vehicle. Alternative frames 20 and means of attachment 22 conforming to the requirements of various types of motor vehicles may readily be adapted to the invention.

Hangars 24 are affixed to frame 20 from which the elongated horizontally disposed deck 26 is suspended by adjustment rods 28 comprised of threaded rod, clevis-headed bolts, or the like. The adjustment rods 28 may be equipped with adjustment nuts 30 which may or may not be separated from hangars 24 by springs.

Lift bars 32 are attachable to a utility vehicle lifting mechanism in order to raise the machine to transport position. Stops 33 limit roll and horizontal pivotal deflection of the deck 26. Drag links 34 allow some motion of the deck 26 relative to the frame 20. One or more casters 36 depend from the frame 20 on the side of the machine opposite from the utility vehicle to which the invention is attached. By keeping the casters 36 close to the deck 26 and minimizing the distance between the deck 26 and the utility vehicle, the terrain following characteristics of the invention are optimized.

A rotary motor 38, preferably a hydraulic motor, is mounted on the deck 26 and comprises means for rotating the rotary brushes 40. As defined herein, the rotary motor 38 includes any source of mechanical rotating power including a hydraulic motor, a hydrostatic motor, a gasoline engine, an electric motor, or a power take-off connection. The rotary motor 38 has an output shaft 39 that drives the rotary brushes 40 by means of a circuitously installed chain 42 that engages a drive sprocket 43, disposed upon the output shaft 39, and driven sprockets 44 disposed upon the upper ends of vertical shafts 46. The shafts 46 extend through, and are rotatably attached to, the deck 26. A rotary brush 40 is attached to the lower end of each of the shafts 46. Chain tensioners 48 attached to the deck 26 prevent misalignment of the chain 42.

The use of chain 42, drive sprocket 43, and driven sprockets 44 assures that the rotary brushes rotate synchronously when the apparatus is in use. It is to be appreciated that the chain 42 installation depicted in FIG. 1 provides that the rotary brushes 40 will counter-rotate synchronously. Counter-rotation is preferred because it allows rotary brushes 40 to be spaced more closely and permits greater overlap of the areas swept. The use of chain 40 is not required in the invention; an equivalent gear train could directly replace the sprocket/chain assembly. Other equivalent systems could be readily practiced. Equivalent drive systems include, but are not limited to, gear drives, cog belt drives, shaft/pinion drives and means or members for moving brushes with orbital motion.

Figure 2:
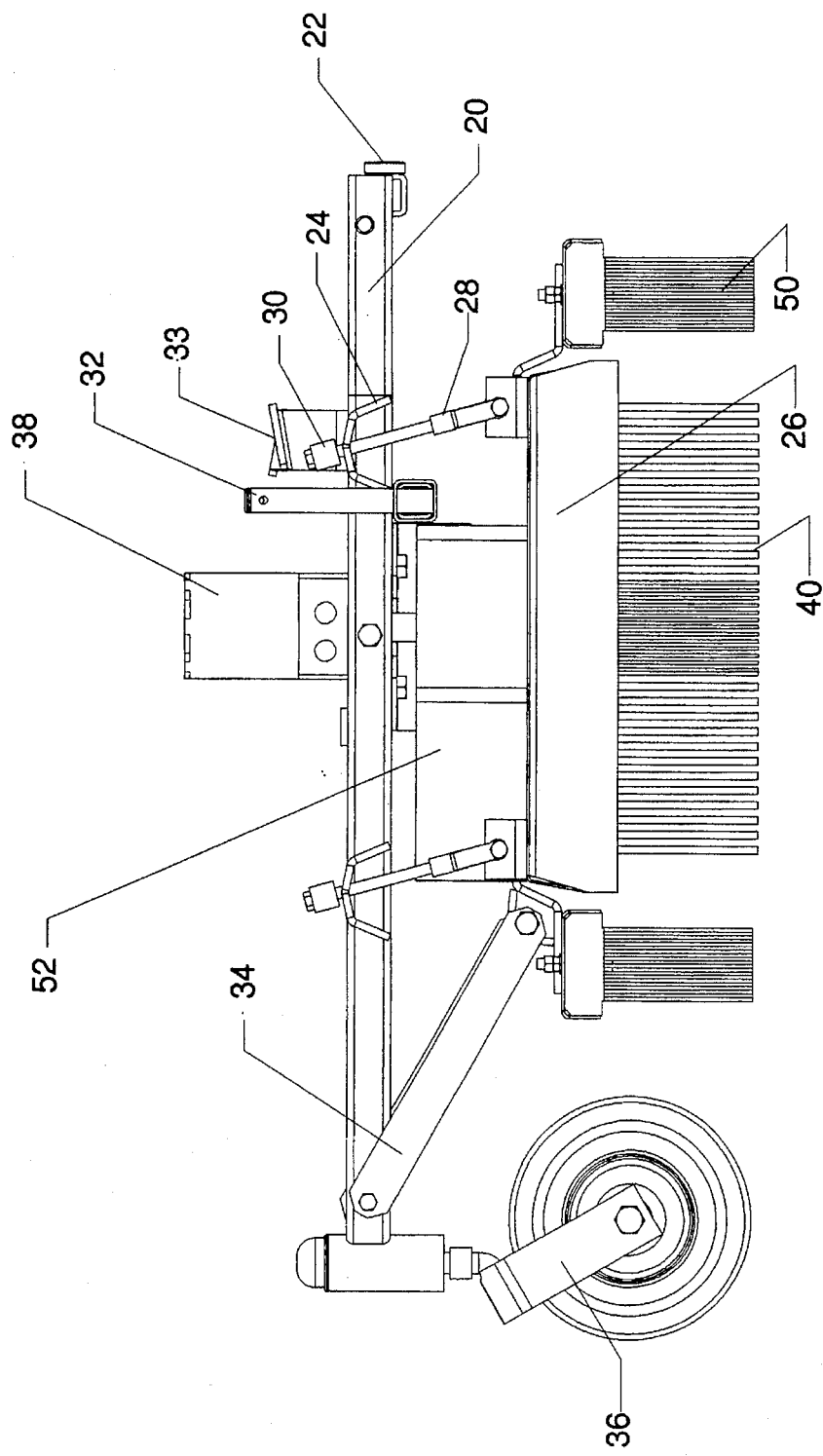
FIG. 2 shows a side elevation of the embodiment depicted in FIG. 1.

Transverse brushes or sweeps 50 may installed to improve machine performance under conditions where heavy applications of topdressing must be incorporated into the turf. The sweeps 50 may be attached to the deck 26 using either fixed or floating mounting. FIG. 2 more clearly depicts the relative positions of the brushes and casters.

Figure 3:
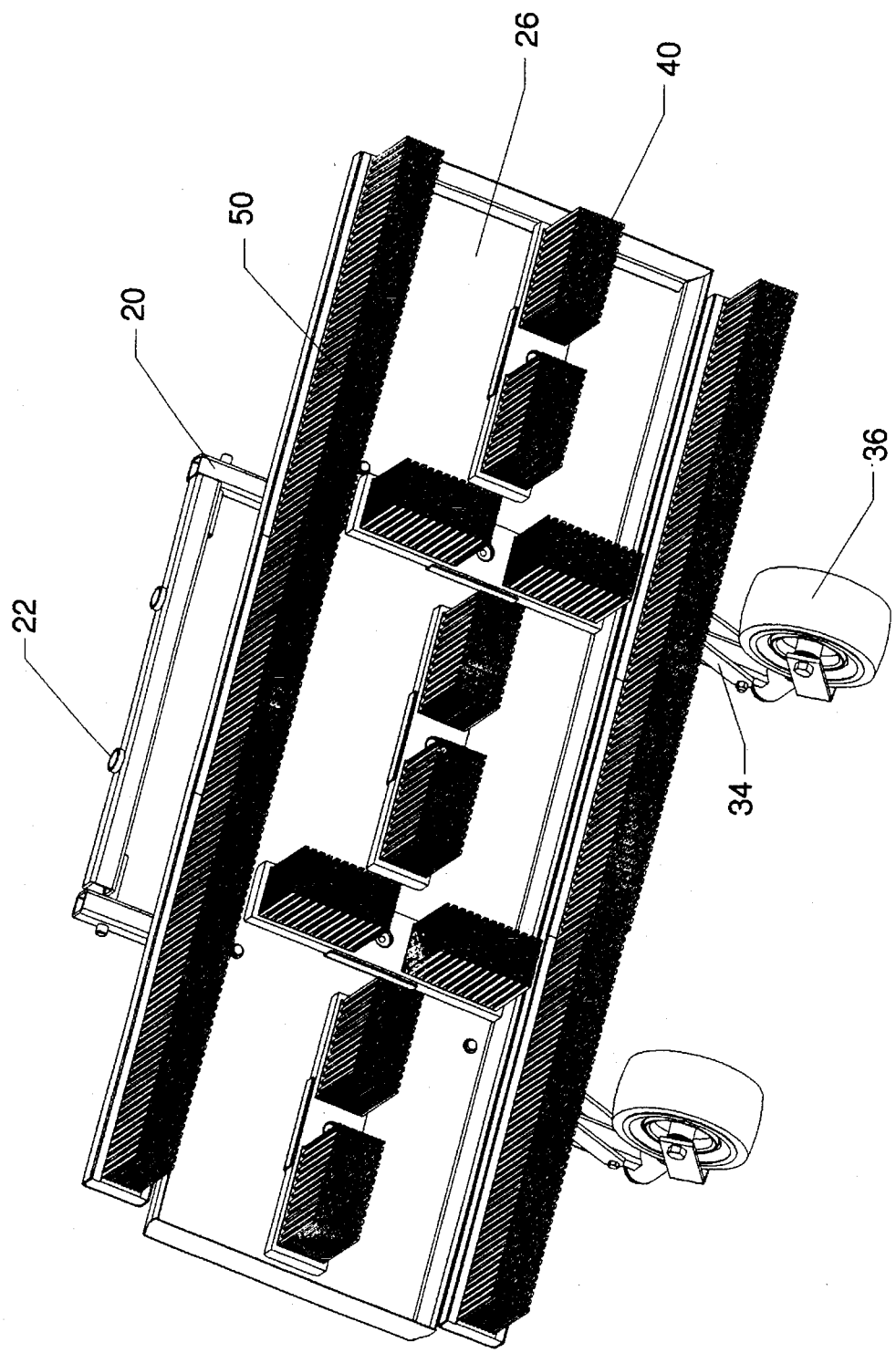
FIG. 3 shows a bottom perspective view of the embodiment depicted in FIG. 1.

A bottom view is presented in FIG. 3 which shows the relationship among the counter-rotating rotary brushes 40 and the sweeps 50. The configuration of the brushes may be modified to avoid orienting the longitudinal centerline of the brush with the direction of machine travel if an embodiment of the invention is adapted to provide orbital motion of the brushes 40.

Figure 4:
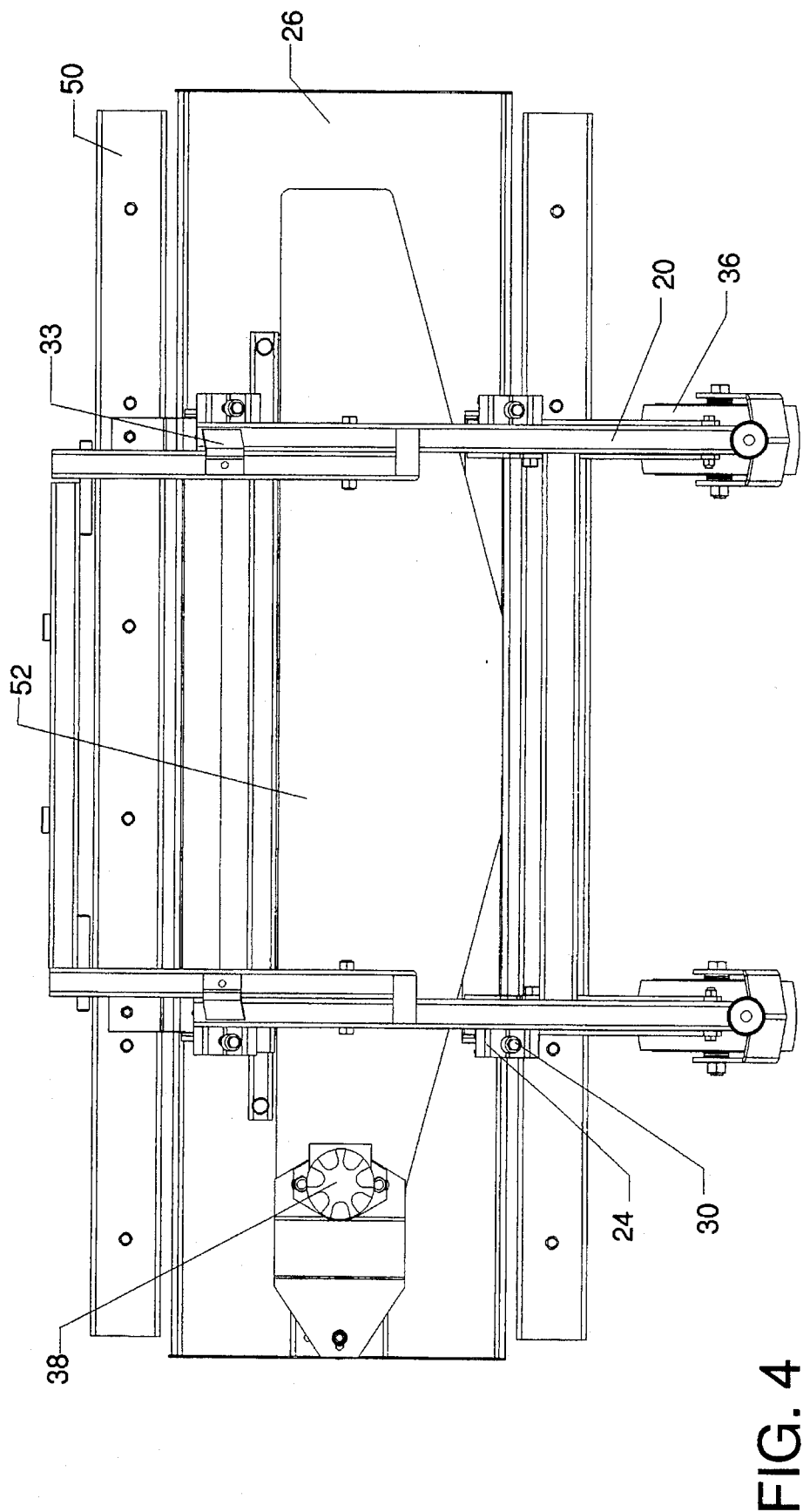
FIG. 4 shows a top plan view of the embodiment depicted in FIG. 1.

In FIG. 4, the top view of the apparatus of the invention more clearly depicts the relative size of the transverse sweeps 50, frame 20, and chain cover 52.

Changes and modifications in the specifically described embodiments can be carried out without departing from the scope of the invention which is intended to be limited only by the scope of the appended claims.

What is claimed is:

1. A turf maintenance and brushing machine adapted for coupling to a motor vehicle for transport across terrain comprising:

a frame;

means for attaching said frame to said motor vehicle;

an elongated, horizontally disposed deck attached to said frame;

a plurality of rotary brushes that depend from said deck generally along the longitudinal centerline of said deck, each of said rotary brushes being:
comprised of an elongated horizontally oriented back from which bristles extend downwardly;
adapted for rotating about a vertical axis of rotation perpendicular to said elongated back in a horizontal plane below and generally parallel to said deck,
spaced apart such that the areas swept by adjacent rotatably attached rotary brushes overlap, and
rotatably attached to said deck;

means for rotating said rotary brushes;

means for causing said rotary brushes to follow terrain contours as said motor vehicle moves said machine across the terrain; and biasing means for adjustably biasing said brushes downward.

2. A turf maintenance and brushing machine as defined in claim 1 wherein said rotary brushes are attached by means comprised of:

a plurality of rotatable vertical shafts, each having an upper end and a lower end, said rotatable vertical shafts being disposed generally along the longitudinal centerline of, and dependent vertically downward from, said elongated deck;

means for attaching the backs of said rotary brushes to the lower ends of said rotatable shafts;

means for rotatably holding the upper ends of said shafts to said deck; and means for rotating said shafts.

3. A turf maintenance and brushing machine as defined in claim 2 comprising:

means for synchronously rotating said elongated rotary brushes.

4. A turf maintenance and brushing machine as defined in claim 3 wherein said means for synchronously rotating said rotary brushes is comprised of:

a rotary motor having an output shaft;

a drive sprocket disposed upon said output shaft;

a driven sprocket disposed proximately to the upper end of each of said rotatable shafts; and a drive chain circuitously interconnecting said sprockets.

5. A turf maintenance and brushing machine as defined in claim 4 wherein said means for synchronously rotating said rotary brushes is further comprised of means for counter-rotating alternate rotary brushes.

6. A turf maintenance and brushing machine as defined in claim 5 wherein said means for following the contours of the terrain is comprised of at least one caster.

7. A turf maintenance and brushing machine as defined in claim 1 further comprising:

at least one horizontal elongated transverse brush dependent from said deck, the longitudinal centerline of said horizontal transverse brush being oriented generally parallel to the longitudinal centerline of said deck.

8. A turf maintenance and brushing machine as defined in claim 7 wherein said deck is spring-mounted to said frame.

9. A turf maintenance and brushing machine as defined in claim 8 wherein means for attaching said rotatably attached rotary brushes is comprised of:

a plurality of rotatable vertical shafts, each having an upper end and a lower end, said vertical shafts situate along the longitudinal centerline of said elongated deck and dependent vertically downward from said deck.

10. A turf maintenance and brushing machine as defined in claim 9 wherein said means for synchronously rotating said rotary brushes is comprised of:

a rotary motor having an output shaft;

a drive sprocket disposed upon said output shaft;

a driven sprocket disposed proximately to the upper end of each of said rotatable shafts; and a drive chain circuitously interconnecting said sprockets.

11. A turf maintenance and brushing machine as defined in claim 10 further comprising at least one elongated transverse brush dependent from said deck generally parallel to the longitudinal axis of said deck.

12. A turf maintenance and brushing machine as defined in claim 11 wherein said means for synchronously rotating said rotary brushes is further comprised of means for counter-rotating alternate rotary brushes.

13. A turf maintenance and brushing machine as defined in claim 12 wherein said means for following the contours of the terrain is comprised of at least one caster.

14. A turf maintenance and brushing machine comprising:

a frame;

means for attaching said frame to a motor vehicle;

an elongated, horizontally disposed deck attached to said frame;

a plurality of rotatable shafts, each having an upper end and a lower end, situate along the longitudinal centerline of said elongated deck and dependent vertically downward from said deck;

a plurality of rotatable rotary brushes having generally vertical bristles extending downwardly from elongated backs attached perpendicularly to the lower ends of said shafts; and means for synchronously rotating said rotatable rotary brushes comprised of:

a rotary motor having an output shaft;

a drive sprocket disposed upon said output shaft;

a driven sprocket disposed proximately to the upper end of each of said rotatable shafts; and a drive chain circuitously interconnecting said sprockets;

means for varying the downward pressure of the bristles against the turf; and means for maintaining the deck at a relatively constant height above the terrain comprised of at least one caster affixed to said frame.

15. A turf maintenance and brushing machine as defined in claim 14 wherein said means for synchronously rotating said brushes is further comprised of means for counter-rotating alternate rotary brushes.

16. A turf maintenance and brushing machine comprising:

a frame;

means for attaching said frame to a motor vehicle;

an elongated, horizontally disposed deck attached to said frame;

a plurality of orbital members, each having an upper end and a lower end, situate about the longitudinal centerline of said elongated deck and dependent vertically downward from said deck;

a plurality of brushes adapted for orbital movement, having elongated backs affixed perpendicularly to the lower ends of said orbital members further comprised of generally vertical bristles extending downwardly;

means for synchronously providing orbital movement to said brushes;

means for adjusting the downward pressure of the bristles against the turf; and means for maintaining the deck at a relatively constant height above the terrain comprised of at least one caster affixed to said frame.

17. A method of incorporating a topdressing into turf comprising the steps of:

forming holes in said turf using an aerator;

distributing said topdressing over the turf;

brushing said topdressing using powered, horizontally rotating, vertically bristled rotary brushes so that said topdressing is moved across the surface of said turf; thereby filling holes formed using said aerator with topdressing which is moved across the surface of said turf by said brushing.

18. The method of claim 17 wherein the step of brushing topdressing is carried out using powered, horizontally alternately counter-rotating, vertically bristled rotary brushes so that said topdressing is moved across the surface of said turf.

19. A method of reducing the grain of turf comprising the steps of:

brushing said turf using powered horizontally rotating, vertically bristled brushes;

causing the bristles of said brushes to describe a swirling route through vegetation comprising said turf;

deflecting, with the bristles of said brushes, the leaves and stems of vegetation comprising said turf in a multiplicity of directions.

20. A turf maintenance and brushing machine adapted for coupling to a motor vehicle for transport across terrain comprising:

a frame;

means for attaching said frame to said motor vehicle;

an elongated, horizontally disposed deck attached to said frame;

a plurality of rotary brushes that depend from said deck generally along the longitudinal centerline of said deck, each of said rotary brushes being:

comprised of an elongated horizontally oriented back from which bristles extend downwardly;

adapted for rotating about a vertical axis of rotation perpendicular to said elongated back in a horizontal plane below and generally parallel to said deck, spaced apart such that the areas swept by adjacent rotatably attached rotary brushes overlap, and rotatably attached to said deck;

means for rotating said rotary brushes;

means for causing said rotary brushes to follow terrain contours as said motor vehicle moves said machine across the terrain; and biasing means for adjustably biasing said brushes downward.

21. A turf maintenance and brushing machine as defined in claim 20 wherein said rotary brushes are attached by means comprised of:

a plurality of rotatable vertical shafts, each having an upper end and a lower end, said rotatable vertical shafts being disposed generally along the longitudinal centerline of, and dependent vertically downward from, said elongated deck;

means for attaching the backs of said rotary brushes to the lower ends of said rotatable shafts;

means for rotatably holding the upper ends of said shafts to said deck; and means for rotating said shafts.

22. A turf maintenance and brushing machine as defined in claim 21 comprising:

means for synchronously rotating said elongated rotary brushes.

23. A turf maintenance and brushing machine as defined in claim 22 wherein said means for synchronously rotating said rotary brushes is comprised of:

a rotary motor having an output shaft;

a drive sprocket disposed upon said output shaft;

a driven sprocket disposed proximately to the upper end of each of said rotatable shafts; and a drive chain circuitously interconnecting said sprockets.

24. A turf maintenance and brushing machine as defined in claim 23 wherein said means for synchronously rotating said rotary brushes is further comprised of means for counter-rotating alternate rotary brushes.

25. A turf maintenance and brushing machine as defined in claim 20 further comprising:

at least one horizontal elongated transverse brush dependent from said deck, the longitudinal centerline of said horizontal transverse brush being oriented generally parallel to the longitudinal centerline of said deck.

26. A turf maintenance and brushing machine as defined in claim 25 wherein said deck is spring-mounted to said frame.

27. A turf maintenance and brushing machine as defined in claim 26 wherein means for attaching said rotatably attached rotary brushes is comprised of:

a plurality of rotatable shafts, each having an upper end and a lower end, situate along the longitudinal centerline of said elongated deck dependent vertically downward from said deck.

28. A turf maintenance and brushing machine as defined in claim 27 wherein said means for synchronously rotating said rotary brushes is comprised of:

a rotary motor having an output shaft;

a drive sprocket disposed upon said output shaft;

a driven sprocket disposed proximately to the upper end of each of said rotatable shafts; and a drive chain circuitously interconnecting said sprockets.

29. A turf maintenance and brushing machine as defined in claim 28 further comprising at least one elongated transverse brush dependent from said deck generally parallel to the longitudinal axis of said deck.

30. A turf maintenance and brushing machine as defined in claim 29 wherein said means for synchronously rotating said rotary brushes is further comprised of means for counter-rotating alternate rotary brushes.

\* \* \* \* \*